United States Patent
Luo et al.

(10) Patent No.: US 8,649,401 B2
(45) Date of Patent: Feb. 11, 2014

(54) GENERATION AND DETECTION OF SYNCHRONIZATION SIGNAL IN A WIRELESS COMMUNICATION SYSTEM

(75) Inventors: Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1051 days.

(21) Appl. No.: 12/112,570

(22) Filed: Apr. 30, 2008

(65) Prior Publication Data

US 2008/0273522 A1 Nov. 6, 2008

Related U.S. Application Data

(60) Provisional application No. 60/915,422, filed on May 1, 2007.

(51) Int. Cl.
*H04J 3/06* (2006.01)

(52) U.S. Cl.
USPC ............ 370/514; 370/350; 375/140; 375/146

(58) Field of Classification Search
USPC ......... 370/310, 345, 350, 464, 498, 503, 509, 370/514; 375/130, 131, 132, 133, 134, 135, 375/136, 137, 140, 141, 145, 146, 150
See application file for complete search history.

(56) References Cited

U.S. PATENT DOCUMENTS

| | | | |
|---|---|---|---|
| 6,563,857 B1 | 5/2003 | Shi et al. | |
| 6,922,546 B1 | 7/2005 | Da et al. | |
| 7,110,782 B2* | 9/2006 | Yamaguchi | 455/502 |
| 7,911,935 B2* | 3/2011 | Akita et al. | 370/208 |
| 8,009,701 B2* | 8/2011 | Luo et al. | 370/503 |
| 8,116,195 B2* | 2/2012 | Hou et al. | 370/210 |
| 8,279,909 B2* | 10/2012 | Noh et al. | 375/146 |
| 2002/0126738 A1 | 9/2002 | Callaway, Jr. et al. | |

(Continued)

FOREIGN PATENT DOCUMENTS

| | | |
|---|---|---|
| JP | 2005327656 A | 11/2005 |
| JP | 2005537691 A | 12/2005 |

(Continued)

OTHER PUBLICATIONS

3GPP TS 36.211 V1.0.0 (Mar. 2007).*

(Continued)

*Primary Examiner* — Chi Pham
*Assistant Examiner* — Weibin Huang
(74) *Attorney, Agent, or Firm* — Larry J. Moskowitz

(57) ABSTRACT

Techniques for generating a synchronization signal (e.g., a secondary synchronization signal) based on an M-sequence are described. In one design, first and second sequences for a secondary synchronization signal may be generated based on different cyclic shifts of the M-sequence. The cyclic shifts may be determined based on cell ID and/or other information to send in the secondary synchronization signal. An output sequence may be generated based on the first and second sequences, e.g., by combining the first and second sequences and scrambling the combined first and second sequences with at least one scrambling sequence. The secondary synchronization signal may then be generated based on the output sequence, e.g., by mapping samples in the output sequence to subcarriers and generating an OFDM symbol with the mapped samples. Detection for the secondary synchronization signal may be efficiently performed using fast M-sequence transform (FMT).

48 Claims, 9 Drawing Sheets

(56) References Cited

U.S. PATENT DOCUMENTS

| | | |
|---|---|---|
| 2003/0063025 A1 | 4/2003 | Low et al. |
| 2003/0081528 A1 | 5/2003 | Saito |
| 2003/0081538 A1 | 5/2003 | Walton et al. |
| 2006/0050799 A1* | 3/2006 | Hou et al. .............. 375/260 |
| 2006/0062196 A1 | 3/2006 | Cai et al. |
| 2006/0098752 A1 | 5/2006 | Song et al. |
| 2007/0019710 A1* | 1/2007 | Lakkis .................. 375/130 |
| 2007/0140106 A1* | 6/2007 | Tsai et al. ............. 370/208 |
| 2007/0206559 A1* | 9/2007 | Cho et al. ............. 370/344 |
| 2007/0253472 A1 | 11/2007 | Jang |
| 2008/0165893 A1 | 7/2008 | Malladi et al. |
| 2009/0219882 A1* | 9/2009 | Kim et al. ............. 370/330 |
| 2009/0219883 A1* | 9/2009 | Cho et al. ............. 370/330 |
| 2010/0054211 A1 | 3/2010 | Gaal |

FOREIGN PATENT DOCUMENTS

| | | |
|---|---|---|
| JP | 2008511269 A | 4/2008 |
| WO | 2008086481 A1 | 7/2008 |
| WO | 2008100076 A1 | 8/2008 |

OTHER PUBLICATIONS

IBM J. Res. Develop, vol. 27, No. 5, "Periodic Sequences with Optimal Properties for Channel Estimation and Fast Start-Up Equalization" by A. Milewski, Sep. 1983.*

IBM J. Res. Develop. vol. 27. No. 5 • Sep. 1983; "Periodic Sequences with Optimal Properties for Channel Estimation and Fast Start-Up Equalization" By A. Milewski.*

3GPP TS 36.211version 1.0.0 (Mar. 2007) $3^{rd}$ Generation Partnership Project; Technical Specification Group Radio Access Network; Physical Channels and Modulation (Release 8), pp. 1-29.

3GPP TS 36.211 V8.1.0, 3rd Generation Partnership Project; Technical Specification Group Radio Access Network; Evolved Universal Terrestrial Radio Access (E-UTRA); Physical channels and modulation (Release 8), (Nov. 2007), pp. 1-64.

Cohn, et al., "On Fast M-Sequence Transforms," IEEE Transactions on Information Theory, Jan. 1977, pp. 135-137.

Sarwate D V et al: "Crosscorrelation Properties of Pseudorandom and Related Sequences" Proceedings of the IEEE, IEEE. New York, US, vol. 68, No. 5, May 1, 1980, ISSN: 0018-9219 Section II and III.

* cited by examiner

PSC = Primary synchronization signal
SSC1 = Secondary synchronization signal for slot 0
SSC2 = Secondary synchronization signal for slot 10

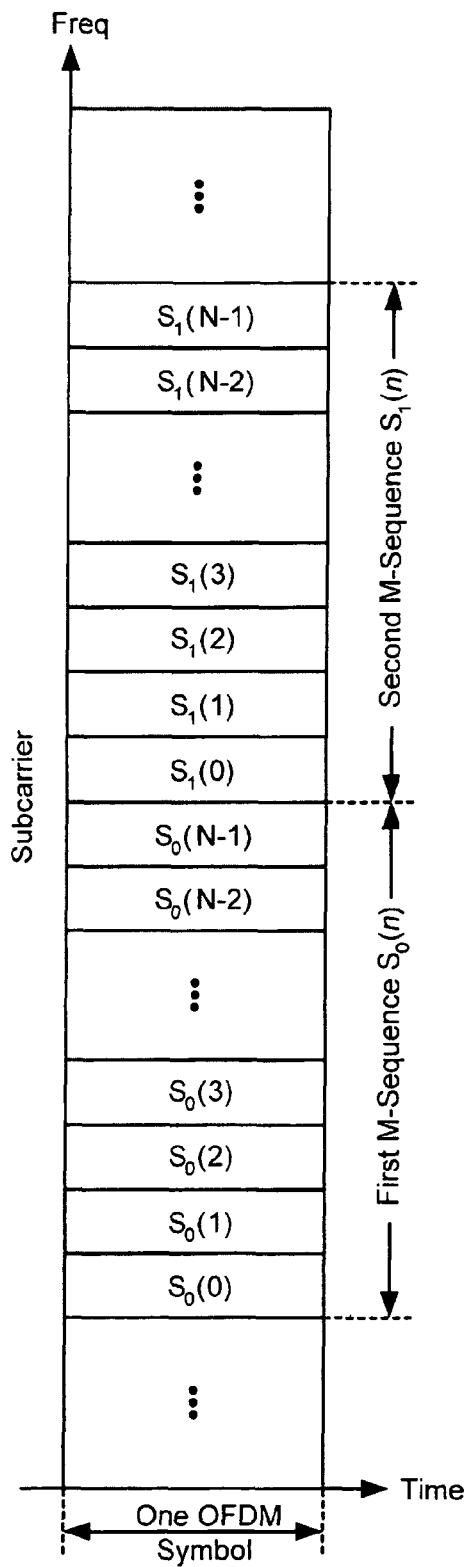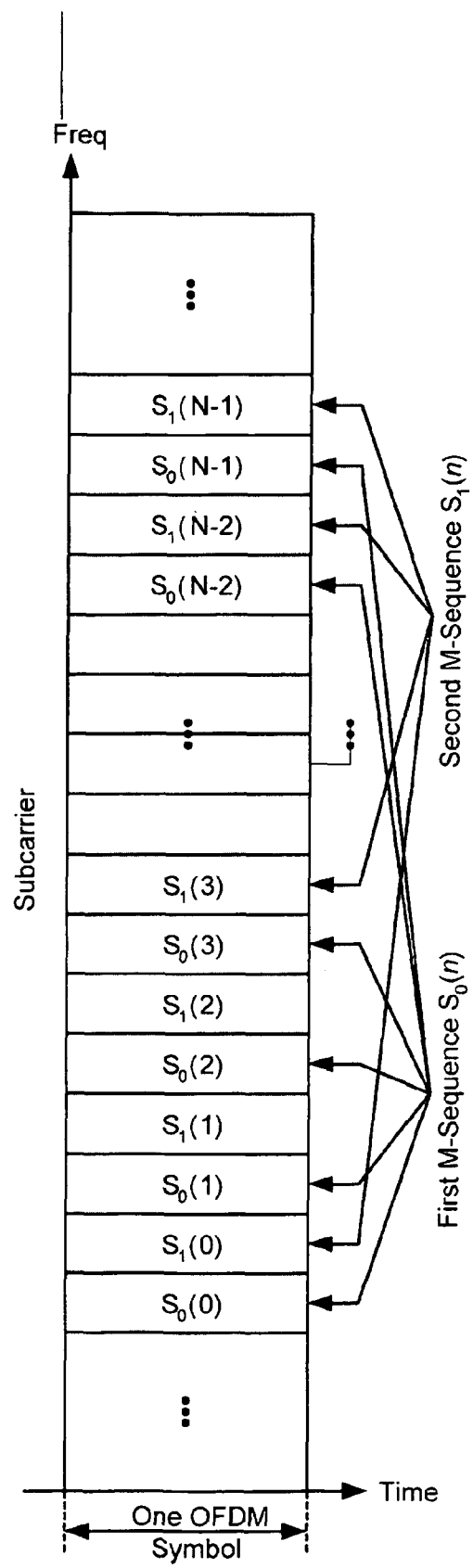
*FIG. 3A*   *FIG. 3B*

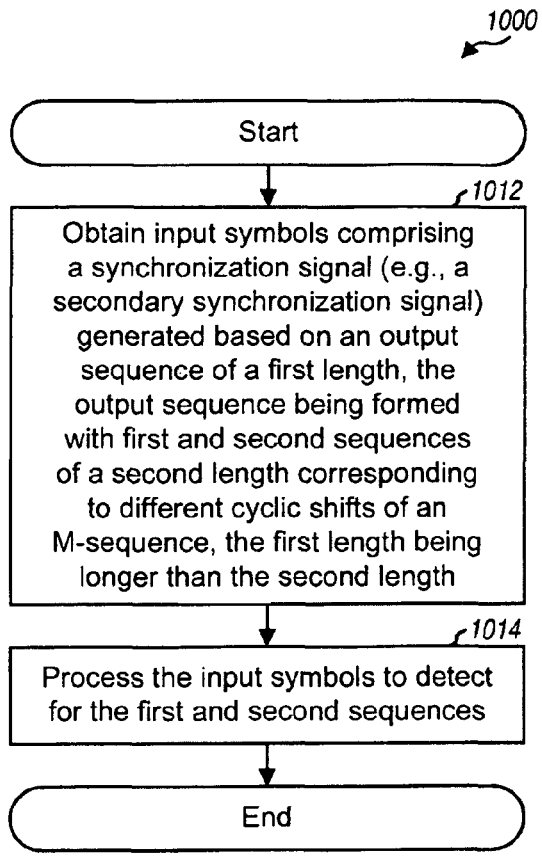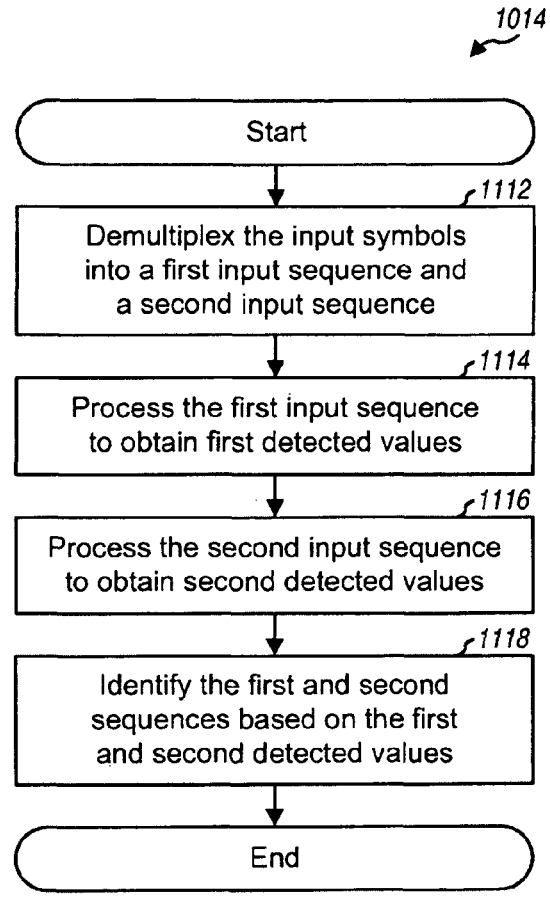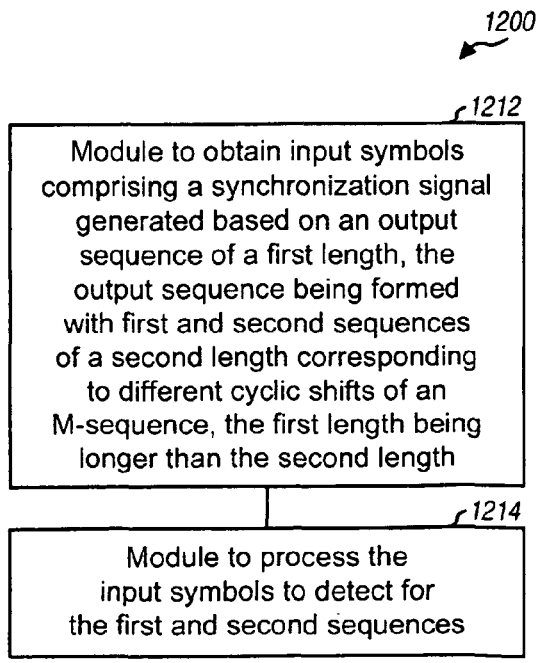
FIG. 10
FIG. 11
FIG. 12

GENERATION AND DETECTION OF SYNCHRONIZATION SIGNAL IN A WIRELESS COMMUNICATION SYSTEM

The present application claims priority to provisional U.S. Application Ser. No. 60/915,422, entitled "SYNCHRONIZATION CODING FOR COMMUNICATIONS," filed May 1, 2007, assigned to the assignee hereof and incorporated herein by reference.

BACKGROUND

I. Field

The present disclosure relates generally to communication, and more specifically to synchronization techniques for a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of user equipments (UEs). A UE (e.g., a cellular phone) may be within the coverage of zero, one, or multiple base stations at any given moment. The UE may have just been powered on or may have lost coverage and thus may not know which base stations can be received. The UE may perform cell search to detect for base stations and to acquire timing and other information for detected base stations.

Each base station may transmit primary and secondary synchronization signals to assist the UEs perform cell search. In general, a synchronization signal may be any signal that assists a receiver to detect for a transmitter and to obtain timing and/or other information for the transmitter. The synchronization signals represent overhead and should be transmitted as efficiently as possible. Furthermore, the synchronization signals should allow the UEs to quickly and efficiently perform cell search.

SUMMARY

Techniques for generating a synchronization signal (e.g., a secondary synchronization signal) by a base station in a wireless communication system are described herein. In an aspect, a synchronization signal may be generated based on a maximum length sequence, which may also be referred to as an M-sequence, an m-sequence, an n-sequence, etc. An M-sequence has good auto-correlation and cross-correlation properties and may provide good detection performance.

In one design of generating a secondary synchronization signal, first and second sequences of a first length may be generated based on different cyclic shifts of an M-sequence. The cyclic shifts may be determined based on cell identity (ID) and/or other information to send in the secondary synchronization signal. The first sequence may be a cyclic shift of u of the M-sequence, and the second sequence may be a cyclic shift of v of the M-sequence. An output sequence of a second length may be generated based on the first and second sequences, e.g., by combining the first and second sequences and scrambling the combined first and second sequences with at least one scrambling sequence. The output sequence is longer than each of the first and second sequences. The combining and scrambling may be performed in different manners depending on whether the secondary synchronization signal is being sent in a first or a second predetermined slot of a radio frame. The secondary synchronization signal may be generated based on the output sequence, e.g., by mapping samples in the output sequence to subcarriers used for the secondary synchronization signal and generating an orthogonal frequency division multiplexing (OFDM) symbol with the mapped samples.

Techniques for detecting for a synchronization signal by a UE are also described herein. In one design, input symbols comprising a secondary synchronization signal may be obtained from subcarriers used for the secondary synchronization signal. The input symbols may be descrambled with at least one scrambling sequence to obtain descrambled symbols. At least one fast M-sequence transform (FMT) may be performed on the descrambled symbols to obtain detected values. The first and second sequences may then be determined based on the detected values.

Various aspects and features of the disclosure are described in further detail below.

BRIEF DESCRIPTION OF THE DRAWINGS

FIG. 3A shows an example mapping of two M-sequences to subcarriers.
FIG. 3B shows another example mapping of two M-sequences to subcarriers.
FIG. 10 shows a process for detecting for a secondary synchronization signal.
FIG. 11 shows a process for processing input symbols.
FIG. 12 shows an apparatus for detecting for a secondary synchronization signal.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
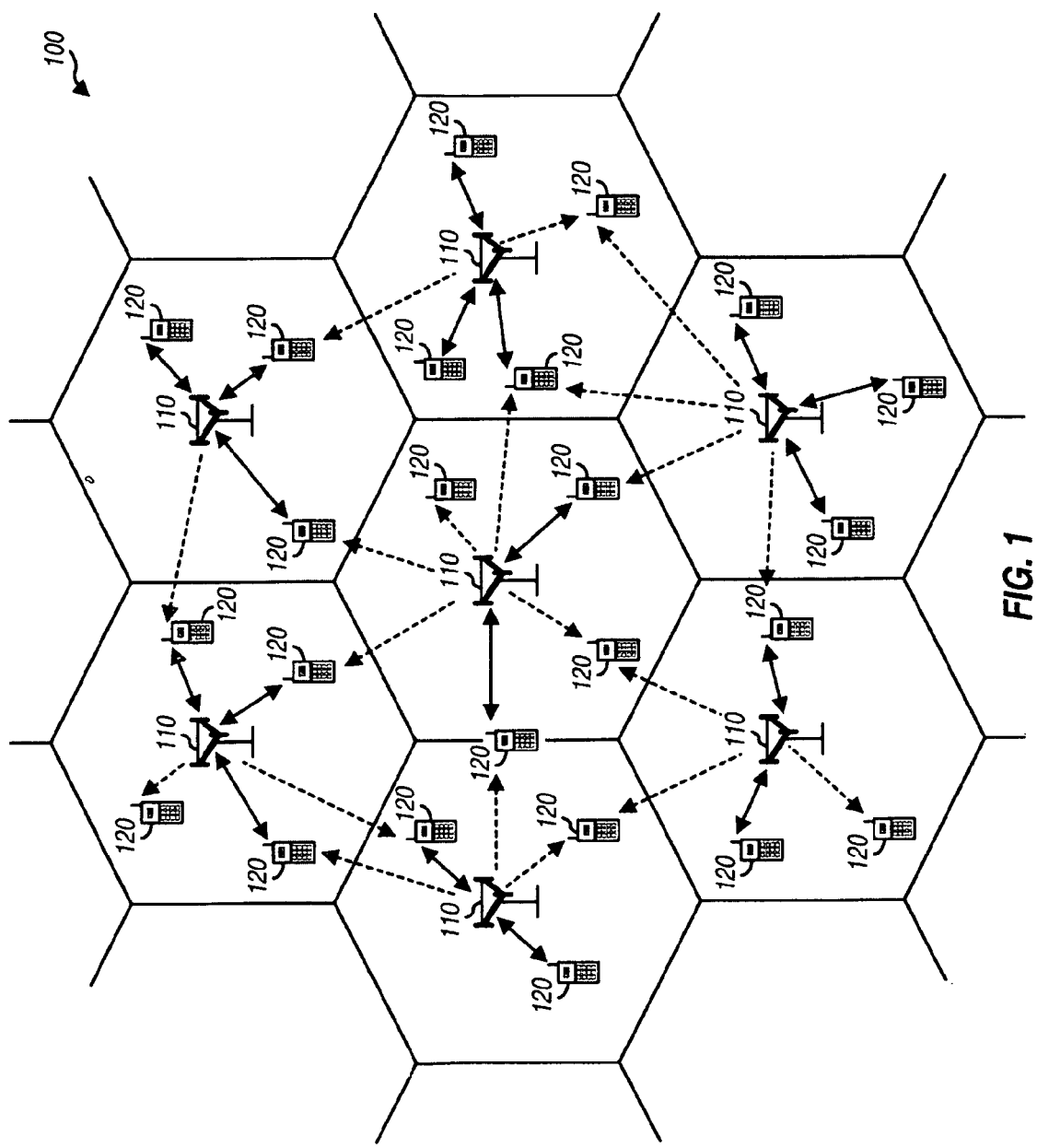
FIG. 1 shows a wireless communication system.

FIG. 1 shows a wireless communication system 100 with multiple evolved Node Bs (eNBs) 110. An eNB may be a fixed station used for communicating with the UEs and may also be referred to as a Node B, a base station, an access point, etc. Each eNB provides communication coverage for a particular geographic area. The overall coverage area of an eNB may be partitioned into multiple (e.g., three) smaller areas. In 3GPP, the term "cell" can refer to the smallest coverage area of an eNB and/or an eNB subsystem serving this coverage area. In other systems, the term "sector" can refer to the smallest coverage area and/pr the subsystem serving this coverage area. For clarity, 3GPP concept of cell is used in the description below.

UEs 120 may be dispersed throughput the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with ah eNB via transmissions on the downlink and uplink. The downlink (or forward link) refers to the communication link from the eNB to the UE, and the uplink (or reverse link) refers to the communication link from the UE to the eNB. In FIG. 1, a solid line with double arrows indicates communication between an eNB and a UE. A broken line with a single arrow indicates a UE receiving downlink signals from an eNB. A UE may perform cell search based on the downlink signals transmitted by the eNBs.

In system 100, eNBs 110 may periodically transmit synchronization signals to allow UEs 120 to detect for the eNBs and to obtain information such as timing, frequency offset, cell ID, etc. The synchronization signals may be generated and transmitted in various manners. In one design that is described in detail below, each eNB periodically transmits a primary synchronization signal and a secondary synchronization signal. A primary synchronization signal may also be referred to as a primary synchronization code (PSC), a PSC sequence, a primary synchronization sequence, a primary synchronization channel (P-SCH), etc., all of which may be used interchangeably. A secondary synchronization signal may also be referred to as a secondary synchronization code (SSC), an SSC sequence, a secondary synchronization sequence, a secondary synchronization channel (S-SCH), etc., all of which may be used interchangeably. The primary and secondary synchronization signals may also be referred to by other names.

Figure 2:
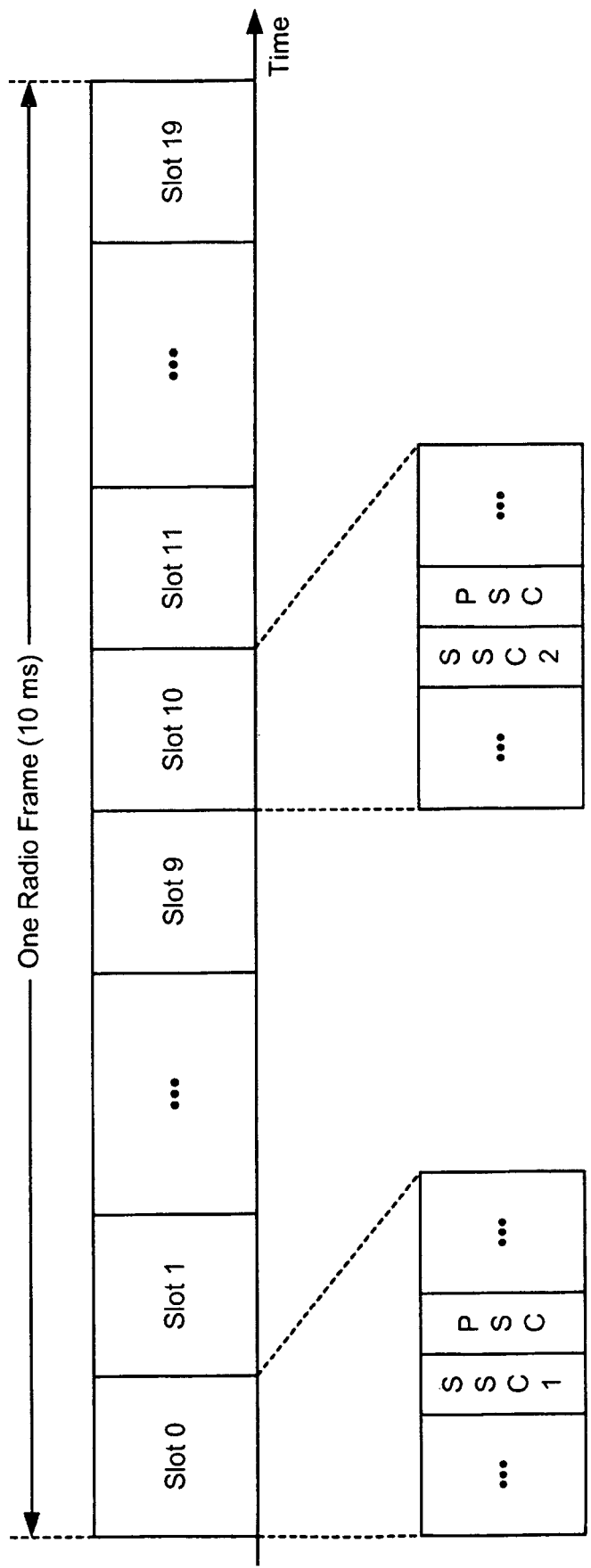
FIG. 2 shows transmission of primary and secondary synchronization signals.

FIG. 2 shows example transmission of the primary and secondary synchronization signals in accordance with one design. The transmission timeline for the downlink may be partitioned into units of radio frames. Each radio frame may have a predetermined duration (e.g., 10 milliseconds (ms)) and may be partitioned into 20 slots with indices of 0 through 19. Each slot may include a fixed or configurable number of OFDM symbols, e.g., six or seven OFDM symbols. In the design shown in FIG. 2, the primary and secondary synchronization signals are sent in two OFDM symbols in each of slots 0 and 10 of each radio frame. In general, the primary and secondary synchronization signals may each be sent at any rate, e.g., any number of times in each radio frame. The secondary synchronization signal may be sent near (e.g., either immediately before or after) the primary synchronization signal, so that a channel estimate may be derived from the primary synchronization signal and used for coherent detection of the secondary synchronization signal.

The primary and secondary synchronization signals may be sent such that the UEs can detect for cells, identify the detected cells, determine timing and frequency offset for each detected cell, and/or obtain other information. In general, each synchronization signal may carry any information. However, more information generally corresponds to more hypotheses to search through.

In one design, all cells may transmit the same primary synchronization signal to allow the UEs to detect for these cells. Different cells may transmit different secondary synchronization signals to allow the UEs to identify these cells and obtain other information for the cells.

In another design, part of the cell ID information, may be sent in the primary synchronization signal, and remaining part of the cell ID information may be sent in the secondary synchronization signal. The available cell IDs in the system may be arranged into G groups, with each group including three cell IDs. Each cell may be assigned one cell ID, which may be given as:

$$C_{ID}=3G_{ID}+N_{ID}, \quad \text{Eq (1)}$$

where $C_{ID}$ is the cell ID,
$G_{ID} \in \{0, \ldots, G-1\}$ is an index of the group to which the cell ID belongs, and
$N_{ID} \in \{0, 1, 2\}$ is an index of a specific ID within the assigned group.

A cell may generate a primary synchronization signal based on its $N_{ID}$ and may transmit this primary synchronization signal in both slots 0 and 10. The cell may also generate a secondary synchronization signal based on its $G_{ID}$ and $N_{ID}$ and may transmit this secondary synchronization signal in slots 0 and 10. The cell may generate the secondary synchronization signal in different manners for slots 0 and 10.

The cell ID and/or other information may also be sent in the primary and secondary synchronization signals in other manners. For clarity, certain aspects of the techniques are described below for the design shown in equation (1).

In an aspect, a secondary synchronization signal may be generated based on an M-sequence having good auto-correlation and cross-correlation properties. An M-sequence is a binary sequence having the longest possible length of $N=2^K-1$ for any given degree K. An M-sequence may be generated with a linear feedback shift register (LFSR) that implements a primitive polynomial. An M-sequence may be used as a frequency-domain M-sequence and sent in the frequency domain, e.g., by mapping the M-sequence to a set of subcarriers, performing an inverse discrete Fourier transform (IDFT), and appending a cyclic prefix to obtain a time-domain sequence. An M-sequence may also be used as a time-domain M-sequence and sent in the time domain, e.g., by using the M-sequence directly as a time-domain sequence. Frequency-domain M-sequences and time-domain M-sequences have different correlation properties. The following description covers the use of M-sequences as frequency-domain M-sequences, which are simply referred to as M-sequences in the description below.

In one design, an M-sequence of length N=31 may be generated based on a primitive polynomial $x^5+x^2+1$ over Galois Field GF(2). This M-sequence may be expressed as:

$$S(n)=\{1,-1,-1,1,1,1,1,1,-1,-1,-1,1,1,-1,-1,1,1,1,-1,\\ 1,-1,1,-1,-1,-1,1,-1,1,1,-1,-1,1,1,-1,1\}, \quad \text{Eq (2)}$$

where S(n) is a base M-sequence, which may also be denoted as S(0,n) or $\tilde{s}(n)$, and n∈{0, ..., 30} is an index of the N samples in the M-sequence.

The base M-sequence S(n) in equation (2) is obtained by initializing an LFSR to a specific initial state. Other M-sequences with other cyclic shifts may be obtained by initializing the LFSR to other initial states. Each sample in the M-sequence may have a value of either 1 or −1, as shown in equation (2), or a binary value of either 1 or 0.

A length-31 M-sequence may also be generated based on other primitive polynomials. M-sequences of other lengths may also be generated based on primitive polynomials of other degrees.

N different M-sequences may be obtained by cyclically shifting the base M-sequence by different amounts, as follows:

$$S(k,n)=S((n+k)\bmod N), \text{ for } k=0,\ldots N-1, \quad \text{Eq (3)}$$

where S(k,n) is an M-sequence with a cyclic shift of k, and "mod" denotes a modulo operation.

For the design with N=31, a total of 31 different M-sequences may be obtained and denoted as S(0,n), S(1,n), ..., S(30,n).

The M-sequences generated as described above have certain desirable properties. First, each M-sequence has ideal periodic auto-correlation (or zero put-of-phase correlation) in the time domain. This follows from the fact that each M-sequence has a constant modulus in the frequency domain. Second, any pair of M-sequences has almost ideal cross-correlation in the time domain. Furthermore, the cross-correlation between any pair of M-sequences is resistant to multi-path effects. These properties make the M-sequences well suited for use for the secondary synchronization signal.

A secondary synchronization signal may be generated based on the M-sequences in various manners. In one design, a secondary synchronization signal may be generated based on two M-sequences:

$$S_0(n)=S(u,n)=S((n+u)\bmod N), \text{ and} \quad \text{Eq (4a)}$$

$$S_1(n)=S(v,n)=S((n+v)\bmod N), \quad \text{Eq (4b)}$$

where u and v are cyclic shifts for M-sequences $S_0(n)$ and $S_1(n)$, respectively.

$S_0(n)$ and $S_1(n)$ may also be denoted as $s_0^{(m_0)}(n)$ and $s_1^{(m_1)}(n)$, respectively. Indices u and v may each be within a range of 0 to N−1; or u, v∈{0, ..., N−1}, and may also be referred to as $m_0$ and $m_1$, respectively. Indices u and v may be determined based on the information to send in the secondary synchronization signal. In one design, indices u and v are determined based on $G_{ID}$, and each unique value of $G_{ID}$ maps to a unique pair of values for u and v. An example mapping of $G_{ID}$ to u and v (or $m_0$ and $m_1$) is described in 3GPP TS 36.211, entitled "Evolved Universal Terrestrial Radio Access (E-UTRA); Physical Channels and Modulation (Release 8)," dated November 2007, which is publicly available.

The use of two M-sequences of length N, instead of one M-sequence of length 2N, may support more possible values/hypotheses. For example, there are $N_{hyp}=N^2$ possible values for two M-sequences of length N versus $N_{hyp}=2N$ possible values for one M-sequence of length 2N. Since one of $N_{hyp}$ possible values may be sent in the secondary synchronization signal, more bits of information may be sent in the secondary synchronization signal using two M-sequences of length N. More than two M-sequences may also be used for the secondary synchronization signal. For clarity, the following description assumes that two M-sequences are used for the secondary synchronization signal.

LTE utilizes OFDM on the downlink and single-carrier frequency division multiplexing (SC-FDM) on the uplink. OFDM and SC-FDM partition the system bandwidth into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, in LTE, $N_{FFT}$ may be equal to 128, 256, 512, 1024 or 2048 for system bandwidth of 1.25, 2.5, 5, 10 or 20 MHz, respectively.

FIG. 3A shows one design of mapping two M-sequences $S_0(n)$ and $S_1(n)$ for the secondary synchronization signal to subcarriers in one OFDM symbol of one slot. In this design, the N samples in the first M-sequence $S_0(n)$ are mapped to N consecutive subcarriers, and the N samples in the second M-sequence $S_1(n)$ are mapped to another N consecutive subcarriers. The 2N subcarriers used for the two M-sequences may be the center 2N subcarriers among the $N_{FFT}$ total subcarriers or may be located tin other parts of the system bandwidth. A concatenated sequence $S_C(n)$ formed with the two M-sequences may be expressed as:

$$S_C(n)=S_0(n), \text{ for } n=0,\ldots,N-1, \text{ and} \quad \text{Eq (5a)}$$

$$S_C(n+N)=S_1(n), \text{ for } n=0,\ldots,N-1. \quad \text{Eq (5b)}$$

The concatenated sequence $S_C(n)$ may be given as:

$$S_C(n)=[S_0(0),S_0(1),\ldots,S_0(N-1),S_1(0),S_1(1),\ldots,\\ S_1(N-1)].$$

FIG. 3B shows another design of mapping two M-sequences $S_0(n)$ and $S_1(n)$ for the secondary synchronization signal to subcarriers in one OFDM symbol of one slot. In this design, the two M-sequences are interleaved in the frequency domain. The N samples in the first M-sequence $S_0(n)$ are mapped to N subcarriers with even indices, and the N samples in the second M-sequence $S_1(n)$ are mapped to N subcarriers with odd indices. The 2N subcarriers used for the two M-sequences may be the center 2N subcarriers among the $N_{FFT}$ total subcarriers or may be located in other parts of the system bandwidth. An interleaved sequence $S_I(n)$ formed with the two M-sequences may be expressed as:

$$S_I(2n)=S_0(n), \text{ for } n=0,\ldots,N-1, \text{ and} \quad \text{Eq (6a)}$$

$$S_I(2n+1)=S_1(n), \text{ for } n=0,\ldots N-1. \quad \text{Eq (6b)}$$

The interleaved sequence $S_I(n)$ may be given as:

$$S_I(n)=[S_0(0),S_1(0),S_0(1),S_1(1),\ldots,S_0(N-1),S_1(N-1)].$$

Although not shown in equation sets (5) and (6), a zero symbol with a signal value of zero may be inserted in the middle of the $S_C(n)$ or $S_I(n)$ sequence and mapped to the center subcarrier. The two M-sequences may also be mapped to subcarriers in other manners. For example, the first M-sequence may be sent in one port of the system bandwidth, and the second M-sequence may be sent in another part of the system, bandwidth.

L subcarriers may be available to send the secondary synchronization signal, where L≥2N. If L=2N, then one sample may be mapped to each available subcarrier. If L>2N, then the extra subcarriers may be handled in several manners. In one design, pilot symbols of known values may be sent on L−2N extra subcarriers. The pilot symbols may be used for coherent detection of the secondary synchronization signal and/or as phase reference for other physical channels to be demodulated. In another design, zero symbols with signal values of zero may be sent on the L−2N extra subcarriers. For both designs, the available transmit power may be distributed (e.g., evenly) across all subcarriers used for the secondary synchronization signal and pilot (if any). The transmit power may be boosted when the extra subcarriers are filled with zero symbols. The length of the M-sequences may be defined based on the number of available subcarriers, and N may be the largest possible value such that 2N≤L. For example, if L=72, then N=31 is the largest possible M-sequence length.

The two M-sequences for the secondary synchronization signal may be scrambled prior to mapping to subcarriers. The scrambling may be performed in various manners.

In one design, a single scrambling sequence is used for both M-sequences. Two scrambled sequences may be generated as follows:

$$D_0(n)=S_0(n)\cdot C(n), \text{ and} \qquad \text{Eq (7a)}$$

$$D_1(n)=S_1(n)\cdot C(n), \qquad \text{Eq (7b)}$$

where $C(n)$ is a scrambling sequence, and
$D_0(n)$ and $D_1(n)$ are two scrambled sequences.

In another design, two scrambling sequences are used for the two M-sequences, one scrambling sequence for each M-sequence. Two scrambled sequences may be generated as follows:

$$D_0(n)=S_0(n)\cdot C_0(n), \text{ and} \qquad \text{Eq (8a)}$$

$$D_1(n)=S_1(n)\cdot C_1(n), \qquad \text{Eq (8b)}$$

where $C_0(n)$ is a scrambling sequence for the first M-sequence $S_0(n)$, and
$C_1(n)$ is a scrambling sequence for the second M-sequence $S_1(n)$.

$C_0(n)$ and $C_1(n)$ may be two different scrambling sequences. Alternatively, $C_0(n)$ and $C_1(n)$ may be different parts of an extended scrambling sequence, e.g., $C_0(n)=C(n)$ and $C_1(n)=C(n+N)$.

In yet another design, one scrambling sequence is applied to the first M-sequence, and two scrambling sequences are applied to the second M-sequence. Two scrambled sequences may be generated as follows:

$$D_0(n)=S_0(n)\cdot C_0(n), \text{ and} \qquad \text{Eq (9a)}$$

$$D_1(n)=S_1(n)\cdot C_1(n)\cdot Z(n), \qquad \text{Eq (9b)}$$

where $Z(n)$ is a scrambling sequence for the second M-sequence $S_1(n)$.

The scrambling sequence $Z(n)$ may result in the output sequence resembling a longer M-sequence and may avoid a scenario in which two M-sequences of length N overlaps. The scrambling may also be performed in other manners. In general, each M-sequence used for the secondary synchronization signal may be scrambled with any number of scrambling sequences.

In one design, the two M-sequences $S_0(n)$ and $S_1(n)$ are mapped to subcarriers in the same manner for both slots 0 and 10 of each radio frame. In another design, the two M-sequences $S_0(n)$ and $S_1(n)$ are swapped in slot 10 relative to slot 0. This may allow the UEs to detect for frame boundary based on the secondary synchronization signal.

For the design shown in FIG. 3A, the concatenated sequences for slots 0 and 10 may be expressed as:

$$S_C(n)=S_0(n) \text{ and } S_C(n+N)=S_1(n) \text{ for slot 0, and} \qquad \text{Eq (10a)}$$

$$S_C(n)=S_1(n) \text{ and } S_C(n+N)=S_0(n) \text{ for slot 10.} \qquad \text{Eq. (10b)}$$

For the design shown in FIG. 3B, the interleaved sequences for slots 0 and 10 may be expressed as:

$$S_1(2n)=S_0(n) \text{ and } S_1(2n+1)=S_1(n) \text{ for slot 0, and} \qquad \text{Eq (11a)}$$

$$S_1(2n)=S_1(n) \text{ and } S_1(2n+1)=S_0(n) \text{ for slot 10.} \qquad \text{Eq (11b)}$$

In one design, scrambling is performed in the same manner for both slots 0 and 10 of each radio frame and may be based on any of the scrambling schemes described above. In another design, scrambling may vary from slot 0 to slot 10. For example, different scrambling sequences may be used for slots 0 and 10.

In one design, the combining and scrambling of the two M-sequences $S_0(n)$ and $S_1(n)$ may be performed as follows:

$$D_0(n) = D(2n) = \begin{cases} S_0(n)\cdot C_0(n) & \text{in slot 0} \\ S_1(n)\cdot C_0(n) & \text{in slot 10} \end{cases} \qquad \text{Eq (12a)}$$

$$D_1(n) = D(2n+1) = \begin{cases} S_1(n)\cdot C_1(n)\cdot Z_0(n) & \text{in slot 0} \\ S_0(n)\cdot C_1(n)\cdot Z_1(n) & \text{in slot 10} \end{cases} \qquad \text{Eq (12b)}$$

where $Z_0(n)$ and $Z_1(n)$ are two scrambling sequences.

In the design shown in equation set (12), the two M-sequences $S_0(n)$ and $S_1(n)$ are interleaved and swapped in slots 0 and 10. The scrambling sequence $C_0(n)$ is used for the N samples with even indices, and the scrambling sequence $C_1(n)$ is used for the N samples with odd indices. The scrambling sequence $Z_0(n)$ is used for the N samples with odd indices in slot 0, and the scrambling sequence $Z_1(n)$ is used for the N samples with odd indices in slot 10. The two scrambled sequences $D_0(n)$ and $D_1(n)$ are interleaved to obtain an output sequence $D(n)$. The N samples in $D_0(n)$ correspond to N samples with even indices in $D(n)$, or $D(2n)$. The N samples in $D_1(n)$ correspond to N samples with odd indices in $D(n)$, or $D(2n+1)$.

A scrambling sequence may be generated in various manners. In one design, a scrambling sequence may be generated based on a Golay sequence or a Gold sequence. In another design, a scrambling sequence may be generated based on an M-sequence, which may have the same length as that of the two M-sequences $S_0(n)$ and $S_1(n)$ or possibly a longer length. A scrambling sequence may also be generated based on other sequences or codes.

In one design, different cells may use different scrambling sequences for their secondary synchronization signals. In one design, a scrambling sequence for a cell may be generated based on the $N_{ID}$ of that cell, which may be obtained by the UEs from the primary synchronization signal. In another design, a scrambling sequence for a cell may be generated based on index u and/or index v for that cell. In general, a scrambling sequence may be generated based on (i) any information (e.g., the $N_{ID}$) for a cell that is already known to the UEs and/or (ii) any information (e.g., indices u and v) to be detected by the UEs for the cell.

In one design, the scrambling sequences $C_0(n)$ and $C_1(n)$ in equation set (12) may be generated based on two cyclic shifts of an M-sequence $C(n)$, as follows:

$$C_0(n)=C((n+N_{ID}) \bmod 31), \text{ and} \qquad \text{Eq (13}a\text{)}$$

$$C_1(n)=C((n+N_{ID}+3) \bmod 31). \qquad \text{Eq (13}b\text{)}$$

The M-sequence C(n) may be generated based on a primitive polynomial $x^5+x^3+1$ over GF(2).

In one design, the scrambling sequences $Z_0(n)$ and $Z_1(n)$ in equation set (12) may be generated based on two cyclic shifts of an M-sequence Z(n), as follows:

$$Z_0(n)=Z(n+(u \bmod 8) \bmod 31), \text{ and} \quad \text{Eq (14a)}$$

$$Z_1(n)=Z(n+(v \bmod 8) \bmod 31), \quad \text{Eq (14b)}$$

where u and v are the cyclic shifts for $S_0(n)$ and $S_1(n)$, respectively. The M-sequence Z(n) may be generated based on a primitive polynomial $x^5+x^4+x^2+x+1$ over GF(2). The "mod 8" operation in equation set (14) results in the two scrambling sequences $Z_0(n)$ and $Z_1(n)$ each being one of eight possible cyclic shifts 0 through 7 of the M-sequence Z(n).

The scrambling sequences may also be generated in other manners and/or with other primitive polynomials.

The scrambling of the two M-sequences $S_0(n)$ and $S_1(n)$ for the secondary synchronization signal may randomize interference across different cells. The scrambling may also reduce cross-correlation between different cyclic shifts in case of very large residual frequency offsets (e.g., 7.5 KHz).

Modulation may be applied to the two M-sequences $S_0(n)$ and $S_1(n)$ for the secondary synchronization signal. In one design, a single modulation symbol may be applied to the two M-sequences $S_0(n)$ and $S_1(n)$, as follows:

$$\tilde{S}_0(n)=S_0(n) \cdot X, \text{ and} \quad \text{Eq (15a)}$$

$$\tilde{S}_1(n)=S_1(n) \cdot X, \quad \text{Eq (15b)}$$

where X is a complex value for the modulation symbol, and $\tilde{S}_0(n)$ and $\tilde{S}_1(n)$ are two modulated M-sequences.

In another design, a different modulation symbol may be applied to each of the two M-sequences $S_0(n)$ and $S_1(n)$, as follows:

$$\tilde{S}_0(n)=S_0(n) \cdot X_0, \text{ and} \quad \text{Eq (16a)}$$

$$\tilde{S}_1(n)=S_1(n) \cdot X_1, \quad \text{Eq (16b)}$$

where $X_0$ and $X_1$ are modulation symbols for M-sequences $S_0(n)$ and $S_1(n)$, respectively.

In the designs shown in equation sets (15) and (16), each sample in the M-sequence $S_0(n)$ or $S_1(n)$ is applied with the same modulation symbol. Applying the same modulation symbol across an entire M-sequence does not alter the desirable correlation properties of the M-sequence.

In general, one or more modulation symbols may be sent in the secondary synchronization signal and may convey any information for a cell. In one design, BPSK modulation may be applied to the M-sequences, and X may have a value of either +1 or −1. A secondary synchronization signal generated with X=+1 may be denoted as +SSC, and a secondary synchronization signal generated with X=−1 may be denoted as −SSC. +SSC and −SSC may be sent in two slots of one radio frame, as follows:

$$[SSC1,SSC2]=[+SSC,-SSC], \text{ or} \quad \text{Eq (17a)}$$

$$[SSC1,SSC2]=[-SSC,+SSC], \quad \text{Eq (17b)}$$

where SSC1 is the secondary synchronization signal sent in slot 0, and

SSC2 is the secondary synchronization signal sent in slot 10.

In equation (17a), +SSC is transmitted in slot 0, and −SSC is transmitted in slot 10. In equation (17b), −SSC is transmitted in slot 0, and +SSC is transmitted in slot 10. In either case, by transmitting different secondary synchronization signals in different slots, the UEs may be able to determine frame timing based on whether +SSC or −SSC is detected in a given slot.

Figure 4:
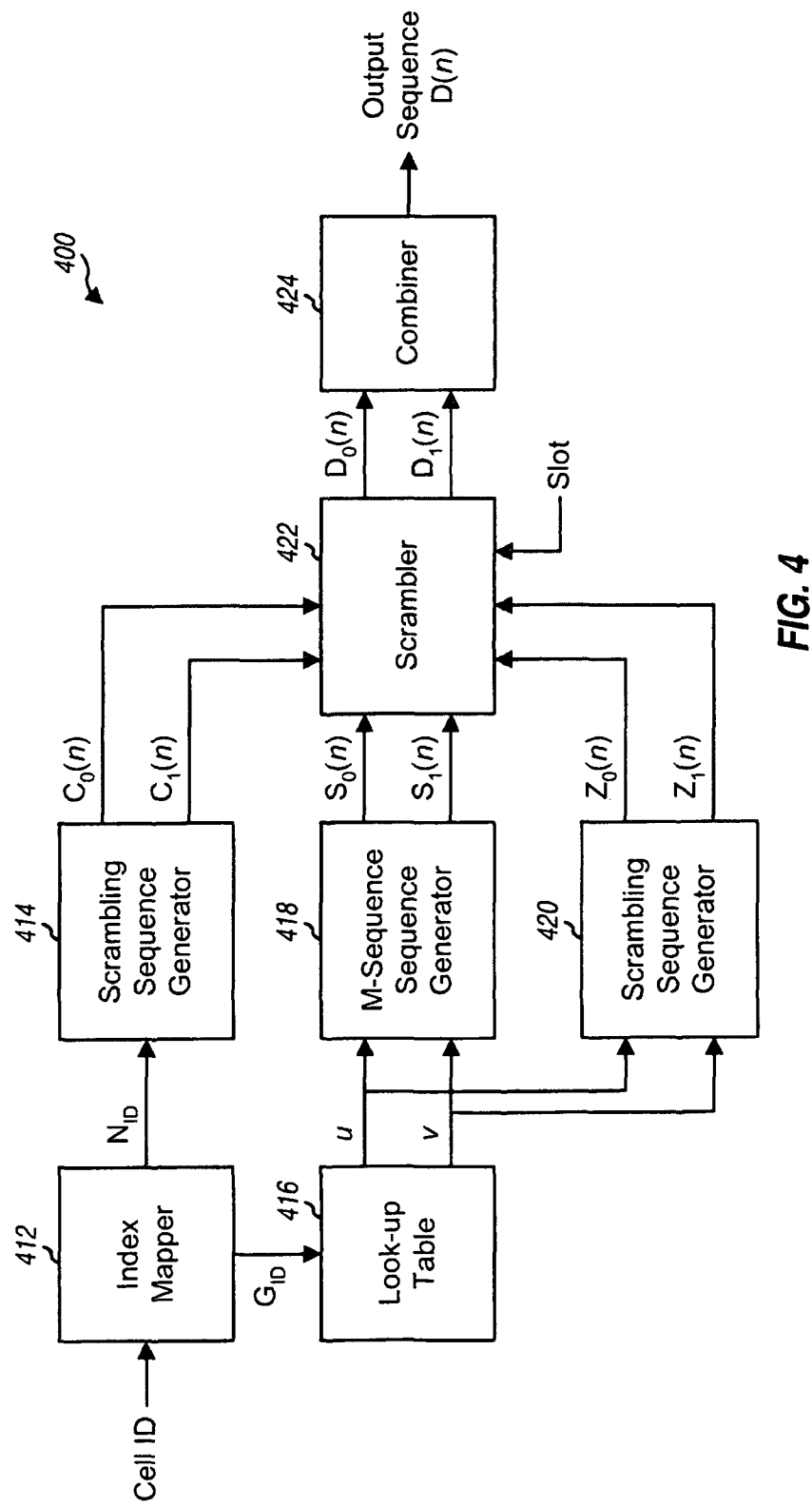
FIG. 4 shows a block diagram of a secondary synchronization signal generator.

FIG. 4 shows a block diagram of a design of a secondary synchronization signal generator 400, which implements the design shown in equation set (12). Within generator 400, an index mapper 412 receives the cell ID and provides indices $G_{ID}$ and $N_{ID}$ for the cell ID, e.g., as shown in equation (1). A scrambling sequence generator 414 receives $N_{ID}$ and generates scrambling sequences $C_0(n)$ and $C_1(n)$, e.g., as shown in equation set (13). A look-up table 416 receives $G_{ID}$ and provides indices u and v based on a predetermined mapping. An M-sequence generator 418 receives indices u and v and generates M-sequences $S_0(n)$ and $S_1(n)$, e.g., as shown in equation set (4). A scrambling sequence generator 420 also receives indices u and v and generates scrambling sequences $Z_0(n)$ and $Z_1(n)$, e.g., as shown in equation set (14). A scrambler 422 receives the M-sequences $S_0(n)$ and $S_1(n)$ and the scrambling sequences $C_0(n)$, $C_1(n)$, $Z_0(n)$ and $Z_1(n)$. Scrambler 422 scrambles the M-sequences $S_0(n)$ and $S_1(n)$ with the scrambling sequences $C_0(n)$, $C_1(n)$, $Z_0(n)$ and $Z_1(n)$, e.g., as shown in equation set (12), and provides two scrambled sequences $D_0(n)$ and $D_1(n)$. The scrambling may be dependent on whether the secondary synchronization signal is being generated for slot 0 or 10, as shown in equation set (12). A combiner 424 interleaves the two scrambled sequences $D_0(n)$ and $D_1(n)$ and provides an output sequence D(n).

Figure 5:
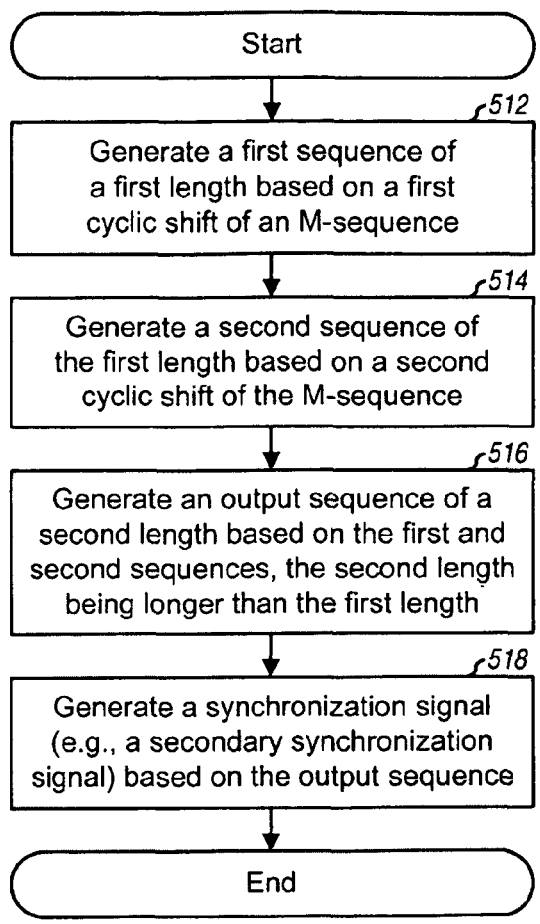
FIG. 5 shows a process for generating a secondary synchronization signal.

FIG. 5 shows a design of a process 500 for generating a synchronization signal (e.g., a secondary synchronization signal) by a cell/eNB. A first sequence (e.g., $S_0(n)$) of a first length may be generated based on a first cyclic shift of a maximum length sequence (M-sequence) (block 512). A second sequence (e.g., $S_1(n)$) of the first length may be generated based on a second cyclic shift of the M-sequence (block 514). The cyclic shifts for the first and second sequences may be determined based on information to send in the synchronization signal. This information may comprise all or a portion of a cell ID, frame timing, antenna information, and/or other information. In one design, indices w and v may be determined based on cell ID information for the cell. The first sequence may be a cyclic shift of u of the M-sequence, and the second sequence may be a cyclic shift of v of the M-sequence. The M-sequence may have a length of N, where N may be equal to 31 or some other value. Indices u and y may be within a range of 0 to N−1 for a total of N different cyclic shifts including no shift. The first and second sequences may also be generated based on cyclic shifts of two M-sequences. In any case, different cells may be assigned different cell IDs and may thus be associated with different pairs of first and second sequences.

An output sequence (e.g., D(n)) of a second length may be generated based on the first and second sequences, with the second length being longer than the first length (block 516). The output sequence may be generated based further on at least one scrambling sequence and/or at least one modulation symbol. The output sequence may also be generated in different manners depending on whether the synchronization signal is being sent in a first or a second predetermined slot (e.g., slot 0 or 10) of a radio frame.

The synchronization signal may be generated based on the output sequence (block 518). For block 518, samples in the output sequence may be mapped to subcarriers used for the synchronization signal. The output sequence may thus be sent in the frequency domain. Pilot symbols and/or zero symbols may also be mapped to other subcarriers. OFDM modulation may be performed on the mapped output sequence and possibly pilot and/or zero symbols to generate the synchronization signal.

Figure 6:
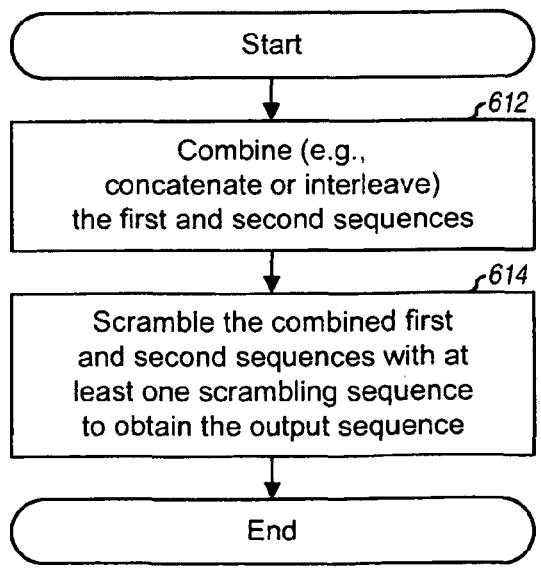
FIG. 6 shows a process for generating an output sequence.

FIG. 6 shows a design of block 516 to generate the output/sequence. The first and second sequences may be combined, e.g., concatenated as shown in FIG. 3A, interleaved as shown in FIG. 3B, or combined in some other manner (block 612). The combining may be dependent on whether the synchronization signal is being sent in slot 6 or 10, e.g., as shown in equation (12). In one design, the first and second sequences may be scrambled with at least one scrambling sequence to obtain the output sequence (block 614). The scrambling may be based on any of the designs described above and may be dependent oil whether the synchronization signal is being sent in slot 0 or 10.

In another design not shown in FIG. 6, the first sequence may be scrambled with at least one first scrambling sequence, the second sequence may be scrambled with at least one second scrambling sequence, and the output sequence may be generated based on the scrambled first and second sequences. In yet another design not shown in FIG. 6, the combined first and second sequences may be scrambled with at least one scrambling sequence and also applied with at least one modulation symbol. The same modulation symbol may be applied to each sample of the first and/or second sequence.

The processing to generate the output sequence may be performed in an order different from the order shown in FIG. 6. For example, the first and second sequences may be scrambled with one or more scrambling sequences, e.g., as shown in equation set (7), (8) or (9). The two scrambled sequences may then be combined to obtain the output sequence.

The processing in FIGS. 5 and 6 may be performed implicitly and/or explicitly. For example, since the cell ID of the cell may be fixed, the output sequence may be pre-computed and stored in memory. The processing in blocks 512, 514, 516, 612 and 614 may thus be implicitly performed by retrieving the output sequence from the memory.

Figure 7:
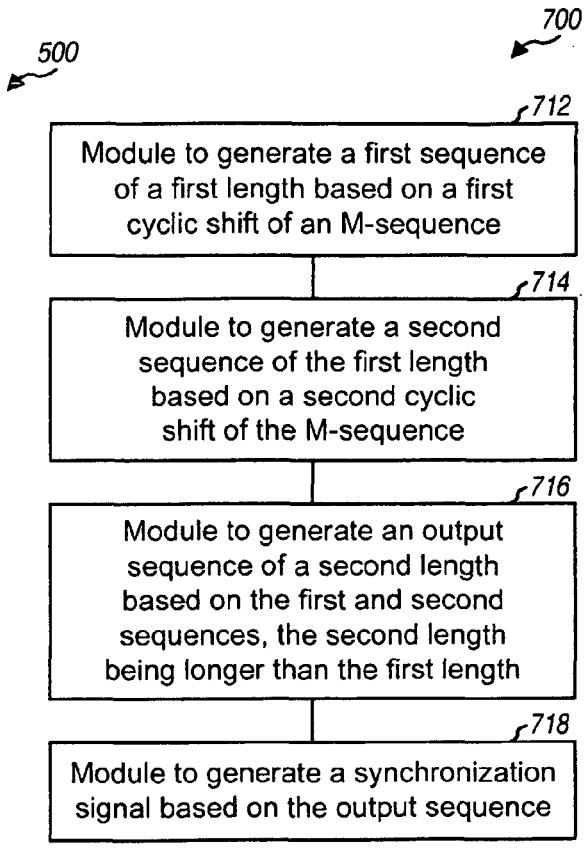
FIG. 7 shows an apparatus for generating a secondary synchronization signal.

FIG. 7 shows a design of an apparatus 700 for generating a synchronization signal (e.g., a secondary synchronization signal) for a cell. Apparatus 700 includes a module 712 to generate a first sequence of a first length based on a first cyclic shift of an M-sequence, a module 714 to generate a second sequence of the first length based on a second cyclic shift of the M-sequence, a module 716 to generate an output sequence of a second length based on the first and second sequences, with the second length being longer than the first length, and a module 718 to generate the synchronization signal based on the output sequence. The modules in FIG. 7 may comprise processors, electronics devices, hardware devices, electronics components, logical circuits, memories, etc., or any combination thereof.

A UE may perform cell search (e.g., at power up) using a two-stage detection process. In one design, the two-stage detection process may include:
1. PSC Detection Stage—
   a. Detect for cells based on the primary synchronization signals transmitted by the cells,
   b. Obtain symbol timing and possibly frame timing for each detected cell, and
   c. Estimate frequency offset and channel response for each detected cell; and
2. SSC Detection Stage—
   a. Identify each detected cell based oh the secondary synchronization, signal transmitted by the cell, and
   b. Obtain frame timing if not provided by the PSC detection stage.

The UE may also obtain other information (e.g., cyclic prefix information, transmit antenna information, etc.) based on the primary and secondary synchronization signals.

For SSC detection, the UE may obtain input symbols from the 2N subcarriers used for the secondary synchronization signal. The UE may demultiplex the input symbols into two input sequences $Q_0(n)$ and $Q_1(n)$, which may correspond to the two output sequences $D_0(n)$ and $D_1(n)$, respectively. The UE may descramble each input sequence in a manner complementary to the scrambling performed by the cell to obtain a descrambled sequence. The UE may then perform a fast M-sequence transform (FMT) on each descrambled sequence to obtain N detected values. These N detected values are indicative of the correlation results between the descrambled sequence and the N possible cyclic shifts of the base M-sequence S(n). For simplicity, the following description assumes N=31.

An FMT may be performed as follows. A 31×31 M-sequence matrix M may be obtained by stacking 31 M-sequences of different cyclic shifts of the base M-sequence S(n), as follows:

$$M = \begin{bmatrix} S(0) & S(1) & \ldots & S(30) \\ S(1) & S(2) & \ldots & S(0) \\ \vdots & \vdots & \ddots & \vdots \\ S(30) & S(0) & \ldots & S(29) \end{bmatrix}. \qquad \text{Eq (18)}$$

As shown in equation (18), the first row of matrix M contains the base M-sequence S(n), the second row contains S(n) cyclically shifted by one, and so on, and the last row contains S(n) cyclically shifted by 30.

The M-sequence matrix M may be expressed as:

$$M = LS, \qquad \text{Eq (19)}$$

where S is a 5×31 matrix containing the first 5 rows of matrix M, and
L is a 31×5 matrix containing 31 unique non-zero vectors of length 5.
Matrix L may be generated based on the primitive polynomial used to generate the base M-sequence S(n).

An extended M-sequence matrix $M_e$ may be expressed as:

$$M_e = L_e S_e = P_L H P_S, \qquad \text{Eq (20)}$$

where $S_e$ is a 5×32 matrix obtained by inserting a column of zeros on the left of S,
$L_e$ is a 32×5 matrix obtained by inserting a row of zeros on top of L,
H is a 32×32 Hadamard matrix, and
$P_L$ and $P_S$ are 32×32 permutation matrices.
The permutation matrices may be expressed as:

$$L_e = P_L B \text{ and } S_e = B^T P_S, \qquad \text{Eq (21)}$$

where B is a 32×5 matrix containing 5-bit values of '00000' through '11111' in 32 rows, and "$^T$" denotes a transpose. The Hadamard matrix may be given as $H = BB^T$.

Equation (20) indicates that an FMT may be performed on 31 input symbols in one input sequence as follows:
1. Insert a zero symbol before the 31 input symbols to obtain 32 total symbols,
2. Rearrange or permute the 32 total symbols in accordance with $P_L$,
3. Perform a 32-point fast Hadamard transform (FHT) on the 32 permuted symbols,
4. Permute the 32 values from the FHT in accordance with $P_S$, and 5. Discard the first of the 32 values and provide the remaining 31 values as 31 detected values from the FMT.

The FMT is described in further detail by M. Cohn and A. Lempel in a paper titled "On Fast M-Sequence Transforms," IEEE Transactions on Information Theory, pp 135-137, January 1977.

Figure 8:
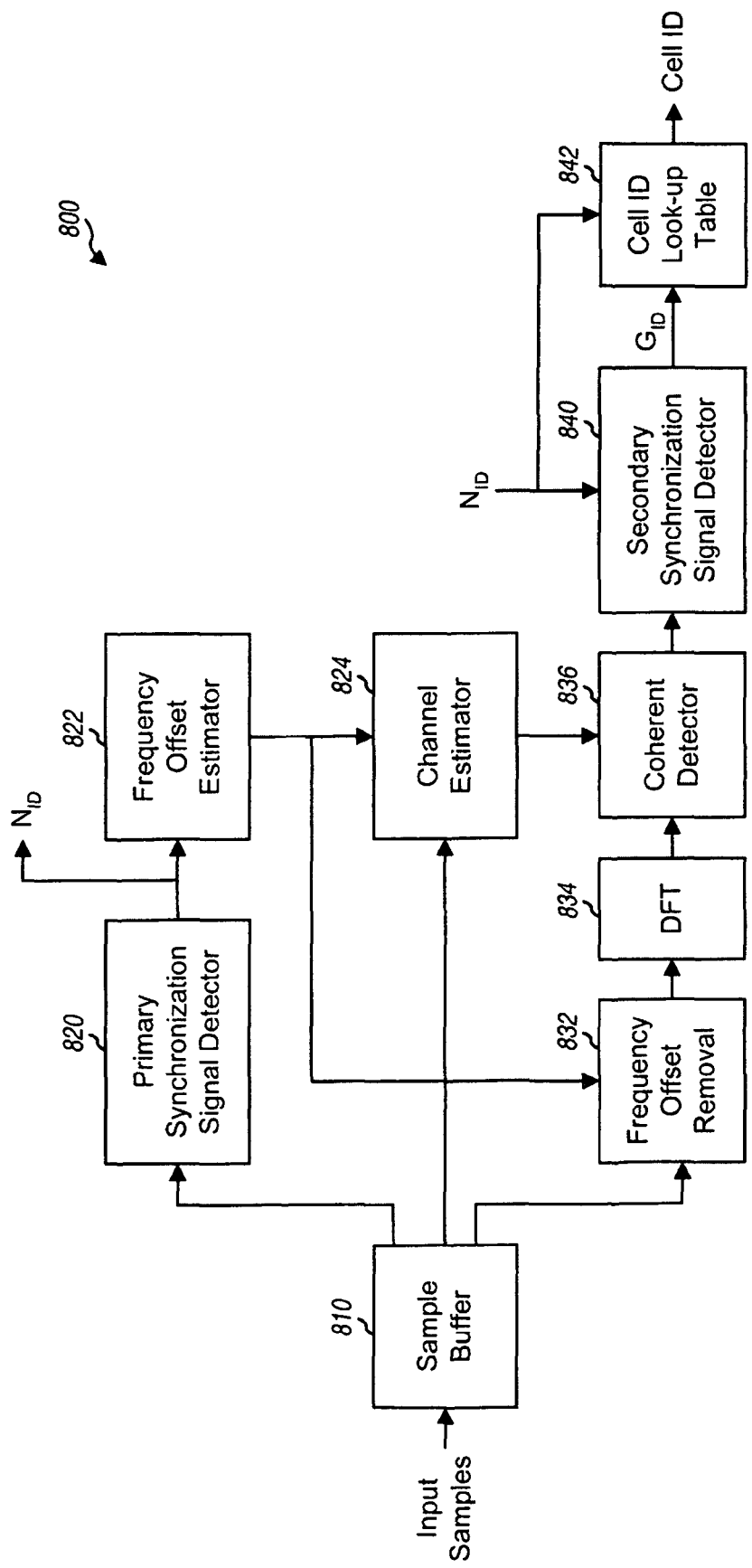
FIG. 8 shows a block diagram of a sync processor at a UE.

FIG. 8 shows a block diagram of a design of a sync processor 800 for a UE. Within sync processor 800, a sample buffer 810 receives and stores received samples and provides appropriate received samples when requested. A primary synchronization signal (PSC) detector 820 detects for a primary synchronization signal in each timing hypothesis, e.g., each sample period. PSC detector 820 may correlate the received samples with different possible PSC sequences to obtain correlation results for the timing hypothesis being evaluated. PSC detector 820 may then determine whether or not a primary synchronization signal is detected based on the correlation results. If a primary synchronization signal is detected, then PSC detector 820 may provide the detected PSC sequence, its symbol timing, and information (e.g., the $N_{ID}$) sent in the primary synchronization signal. A unit 822 estimates frequency offset based on the correlation results from PSC detector 820. A channel estimator 824 derives a channel estimate by removing the detected PSC sequence from the input symbols and deriving channel gains for different subcarriers.

SSC detection may be performed whenever a primary synchronization signal is detected. A unit 832 obtains received samples for an OFDM symbol (e.g., in slot 0 or 10) and removes the estimated frequency offset from these samples. A discrete Fourier transform (DFT) unit 834 transforms the frequency-corrected samples to frequency domain and provides received symbols. A coherent detector 836 performs coherent detection of the received symbols with the channel gains from channel estimator 824 and provides input symbols. A secondary synchronization signal (SSC) detector 840 detects for the two M-sequences $S_0(n)$ and $S_1(n)$ based on the input symbols and cell ID information (e.g., the $N_{ID}$) from PSC detector 820 and provides cell ID information (e.g., the $G_{ID}$) sent in the secondary synchronization signal. A look-up table 842 may receive the cell information (e.g., $G_{ID}$ and $N_{ID}$) from detectors 820 and 840 and provide the cell ID of each detected cell.

Figure 9:
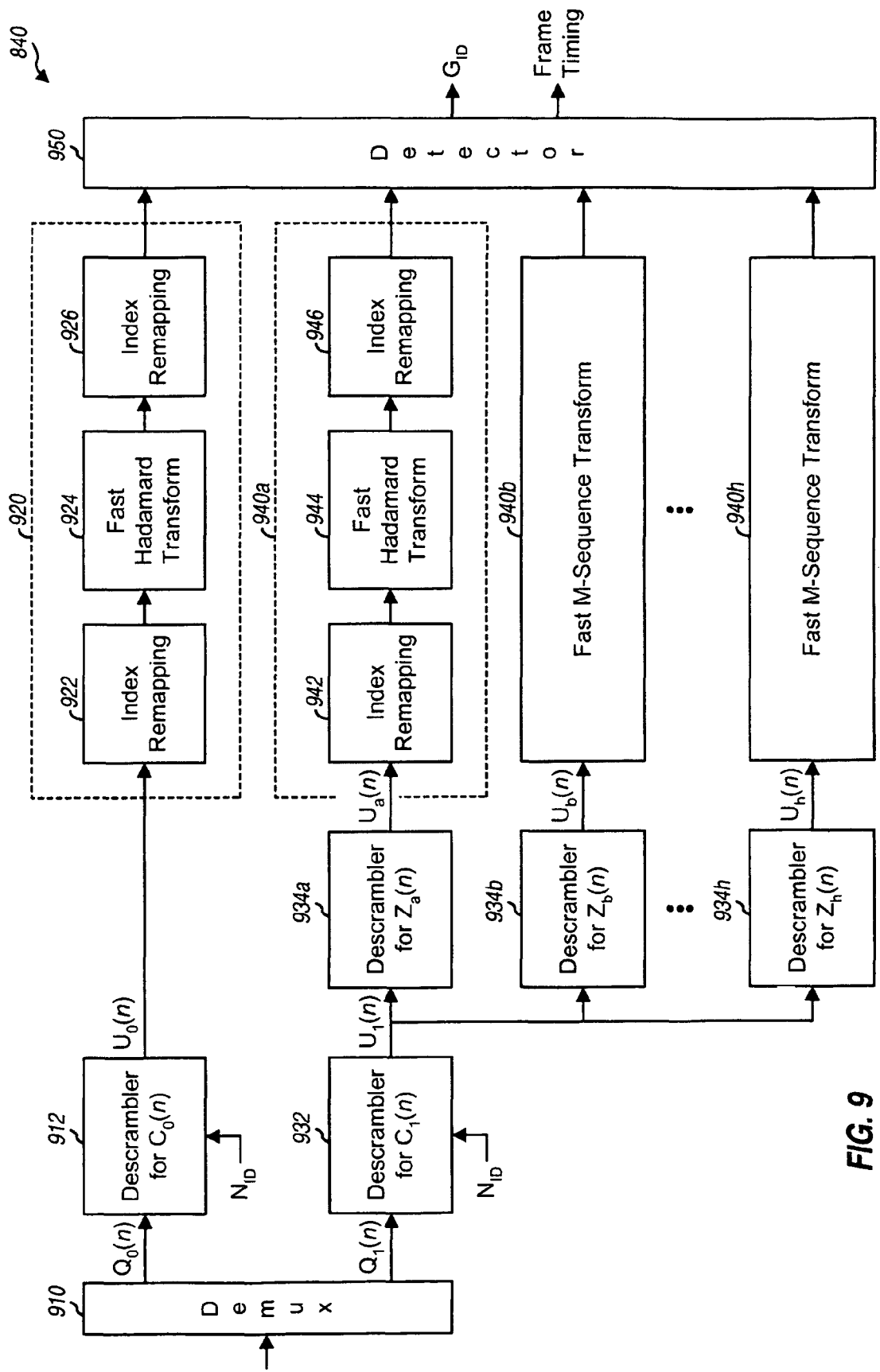
FIG. 9 shows a block diagram of a secondary synchronization signal detector.

FIG. 9 shows a block diagram of a design of SSC detector 840, which performs detection for the design shown in equation set (12). Within SSC detector 840, a demultiplexer (Demux) 910 receives input symbols from all subcarriers used for the secondary synchronization signal, provides a first input sequence $Q_0(n)$ comprising input symbols with even indices to a descrambler 912, and provides a second input sequence $Q_1(n)$ comprising input symbols with odd indices to a descrambler 932. In general, the demultiplexing is dependent on the combining performed by the cell for the two M-sequences $S_0(n)$ and $S_1(n)$.

Descrambler 912 and an FMT unit 920 process the first input sequence $Q_0(n)$, which corresponds to the first output sequence $D_0(n)$ in equation (12a). The first output sequence $D_0(n)$ is generated with the scrambling sequence $C_0(n)$, which is generated based on $N_{ID}$. Descrambler 912 receives the $N_{ID}$ front PSC detector 820 in FIG. 8 and generates the scrambling sequence $C_0(n)$ based on the $N_{ID}$. Descrambler 912 then descrambles the first input sequence $Q_0(n)$ with the scrambling sequence $C_0(n)$ and provides a first descrambled sequence $U_0(n)$. Within FMT unit 920, an index remapping unit 922 appends a zero symbol to the first descrambled sequence $U_0(n)$ and reorders the 32 symbols in the resultant sequence. An FHT unit 924 performs a 32-point FHT on the sequence from unit 922 and provides 32 values. An index remapping unit 926 reorders the 32 values from FHT unit 924, discards the first value, and provides the remaining 31 values as the 31 detected values for the first input sequence $Q_0(n)$. These 31 detected values are indicative of the correlation results between the first input sequence $Q_0(n)$ and the 31 possible cyclic shifts of the base M-sequence $S(n)$, with $S_0(n)$ and $S_1(n)$ being two of these 31 possible cyclic shifts.

Descrambler 932, eight descramblers 934a through 934h, and eight FMT units 940a through 940h process the second input sequence $Q_1(n)$, which corresponds to the second output sequence $D_1(n)$ in equation (12b). The second output sequence $D_1(n)$ is generated with the scrambling sequence $C_1(n)$ and either the scrambling sequence $Z_0(n)$ or $Z_1(n)$. The scrambling sequence $C_1(n)$ is generated based on the $N_{ID}$, which is available from PSC detector 820. The scrambling sequences $Z_0(n)$ and $Z_1(n)$ are generated based on u and v, which are not yet known. Eight possible scrambling sequences may be used for $Z_0(n)$ and $Z_1(n)$ and are denoted as $Z_a(n)$ through $Z_h(n)$. Descrambler 932 receives the $N_{ID}$ from PSC detector 820 and generates the scrambling sequence $C_1(n)$ based on $N_{ID}$. Descrambler 932 then descrambles the second input sequence $Q_1(n)$ with the scrambling sequence $C_1(n)$ and provides a second descrambled sequence $U_1(n)$.

The eight sets of descrambler 934 and FMT unit 940 perform detection for the eight possible scrambling sequences $Z_a(n)$ through $Z_h(n)$. For scrambling sequence $Z_a(n)$, descrambler 934a descrambles the second descrambled sequence $R_1(n)$ with the scrambling sequence $Z_a(n)$ and provides a descrambled sequence $U_a(n)$. Within FMT unit 940a, an index remapping unit 942 appends a zero symbol to the descrambled sequence $U_a(n)$ and reorders the 32 symbols in the resultant sequence. An FHT unit 944 performs a 32-point FHT on the sequence from unit 942 and provides 32 values. An index remapping unit 946 reorders the 32 values from FHT unit 944, discards the first value, and provides the remaining 31 values as the 31 detected values for the hypothesis with the scrambling sequence $Z_a(n)$. These 31 detected values are indicative of the correlation results between the second input sequence $Q_1(n)$ and the 31 possible cyclic shifts of the base M-sequence $S(n)$ and assuming that the scrambling sequence $Z_a(n)$ was used by the cell. Each remaining set of descrambler 934 and FMT unit 940 similarly process the second descrambled sequence $U_1(n)$ for a different scrambling sequence $Z(n)$ and provides 31 detected values for the hypothesis with that scrambling sequence.

A detector 950 receives the 31 detected values from FMT unit 920 and eight sets of 31 detected values from FMT units 940a through 940h. Detector 950 determines the two M-sequences $S_0(n)$ and $S_1(n)$ that are most likely to have been sent based on all of the detected values and a table (or an SSC codebook) of the allowable combinations of $S_0(n)$ and $S_1(n)$. Detector 950 determines $G_{ID}$ based on the detected M-sequences $S_0(n)$ and $S_1(n)$ and provides the $G_{ID}$ and frame timing for the detected cell.

Although not shown in FIG. 9 for simplicity, the UE may obtain input symbols from multiple receive antennas and may combine detected values across all antennas prior to determining which two M-sequences $S_0(n)$ and $S_1(n)$ were transmitted.

A cell may transmit using one of multiple possible cyclic prefix lengths. A slot may include seven OFDM symbols for a normal cyclic prefix length or six OFDM symbols for a long cyclic prefix length. The UE may first perform SSC detection assuming that the normal cyclic prefix length was used and may then perform SSC detection assuming that the long cyclic prefix length was used.

FIG. 10 shows a design of a process 1000 for detecting for a synchronization signal (e.g., a secondary synchronization signal) by a UE. Input symbols comprising a synchronization signal generated based on an output sequence of a first length may be obtained (block 1012). The output sequence may be formed with first and second sequences of a second length corresponding to different cyclic shifts of an M-sequence. The first length may be longer than the second length. The input symbols may be processed to detect for the first and second sequences (block 1014). For block 1014, the input symbols may be descrambled with at least one scrambling sequence to obtain descrambled symbols. At least one FMT may be performed on the descrambled symbols to obtain detected values. The first and second sequences may then be determined based on the detected values.

FIG. 11 shows a design of block 1014 to process the input symbols, with the synchronization signal generated as shown in equation set (12). The input symbols may be demultiplexed into a first input sequence and a second input sequence (block 1112). In one design, the first input sequence may comprise input symbols with even indices, and the second input sequence may comprise input symbols with odd indices.

The first input sequence may be processed to obtain first detected values (block 1114). For block 1114, the first input sequence may be descrambled with a scrambling sequence (e.g., $C_0(n)$) to obtain a descrambled sequence. The scrambling sequence may be generated based on cell ID information obtained from a primary synchronization signal. An FMT may be performed on the descrambled sequence to obtain the first detected values.

The second input sequence may be processed to obtain second detected values (block 1116). For block 1116, the second input sequence may be descrambled with a first scrambling sequence to obtain a first descrambled sequence. The first descrambled sequence may be further descrambled with multiple second scrambling sequences (e.g., $Z_a(n)$ through $Z_b(n)$) to obtain multiple second descrambled sequences. Multiple FMTs may be performed on the multiple second descrambled sequences to obtain the second detected values.

The first and second sequences may be identified based on the first and second detected values (block 1118). For block 1118, the first and second detected values may be combined for each possible hypothesis of the first and second sequences. The best combined value may be identified. The first and second sequences corresponding to this best combined value may be provided as the detected first and second sequences.

FIG. 12 shows a design of an apparatus 1200 for detecting for a synchronization signal (e.g., a secondary synchronization signal). Apparatus 1200 includes a module 1212 to obtain input symbols comprising a synchronization signal generated based on an output sequence of a first length, the output sequence being formed with first and second sequences of a second length corresponding to different cyclic shifts of an M-sequence, and the first length being longer than the second length, and a module 1214 to process the input symbols to detect for the first and second sequences. The modules in FIG. 12 may comprise processors, electronics devices, hardware devices, electronics components, logical circuits, memories, etc., or any combination thereof.

A secondary synchronization signal may be generated with a Hadamard sequence in the frequency domain. The use of the Hadamard sequence may allow the UEs to efficiently perform SSC detection using FHT. Different cells may use different Hadamard sequences. These Hadamard sequences are orthogonal to one another in a flat channel, but poor correlation may exist between certain pairs of Hadamard sequences in a frequency selective channel. Thus, a secondary synchronization signal generated based on a Hadamard sequence may not provide good detection performance in a frequency selective channel.

A secondary synchronization signal generated based on an M-sequence may provide certain advantages over a secondary synchronization signal generated based on a Hadamard sequence. A secondary synchronization signal generated based on an M-sequence may allow for efficient SSC detection using FMT. Since the M-sequence is resistant to a frequency selective channel a secondary synchronization signal generated based on the M-sequence may provide good detection performance in such a frequency selective channel.

Computer simulations were performed to evaluate detection performance for secondary synchronization signals generated with Hadamard and M-sequences. The computer simulations indicate that a secondary synchronization signal generated based on an M-sequence may provide better detection performance and have better cross-correlation properties in a frequency selective channel than a secondary synchronization signal generated based on a Hadamard sequence.

In another aspect, a set of synchronization sequences of length N may be generated based on different cyclic shifts of an M-sequence $S(n)$ of length N, as follows:

$$S_p(n) = S((n + \Delta \cdot p) \bmod N), \text{ for } p=0, \ldots, P-1, \quad \text{Eq (22)}$$

where p is an index for the synchronization sequences,
Δ is a frequency increment, and
$S_p(n)$ is a synchronization sequence with a cyclic shift of $\Delta \cdot p$.

The frequency increment Δ may be any value that is sufficiently large to avoid frequency acquisition ambiguity problems. In one design, Δ may be a fixed value, and the P synchronization sequences may have different cyclic shifts separated by a uniform step size. In another design, the cyclic shifts for the P synchronization sequences may be separated by non-uniform step sizes. In any case, the number of available synchronization sequences may be dependent on the synchronization sequence length N and the frequency increment Δ, which may in turn be dependent on the initial frequency uncertainty. The number of available synchronization sequences is not limited by the maximum delay spread in a communication channel because these synchronization sequences are not time-domain cyclically shifted versions of each other.

An entire synchronization sequence $S_p(n)$ may be sent on N subcarriers in the frequency domain. In one design, the synchronization sequence may be mapped to N consecutive subcarriers. In another design, the synchronization sequence may be repeated and mapped to Q·N subcarriers, where Q is the number of repetitions. In yet another design, the synchronization sequence may be mapped to N non-consecutive subcarriers that may be spaced apart by Q subcarriers. In any case, the subcarriers not used for the synchronization sequence may be used to send data or may be set to zero $N_{FFT}$ symbols may be obtained for the mapped synchronization sequence, data, and/or zero for $N_{FFT}$ total subcarriers. An $N_{FFT}$-point IDFT may be performed on the $N_{FFT}$ symbols to obtain a useful portion containing $N_{FFT}$ time-domain samples. A cyclic prefix may be appended to the useful portion to obtain an OFDM symbol containing the synchronization sequence sent in the frequency domain.

Different cells may transmit different synchronization signals of different cyclic shifts in the frequency domain on the same set of subcarriers. The synchronization sequences may provide a number of favorable properties such as:

1. Low peak-to-average ratio (PAR) of a time domain waveform generated with a synchronization sequence sent in the frequency domain,
2. Each synchronization sequence has ideal periodic auto-correlation, i.e., zero out-of-phase correlation,
3. Any pair of synchronization sequences has almost ideal cross-correlation, and
4. Correlation of the synchronization sequences in the frequency domain may be accomplished with simple addition operations.

Figure 13:
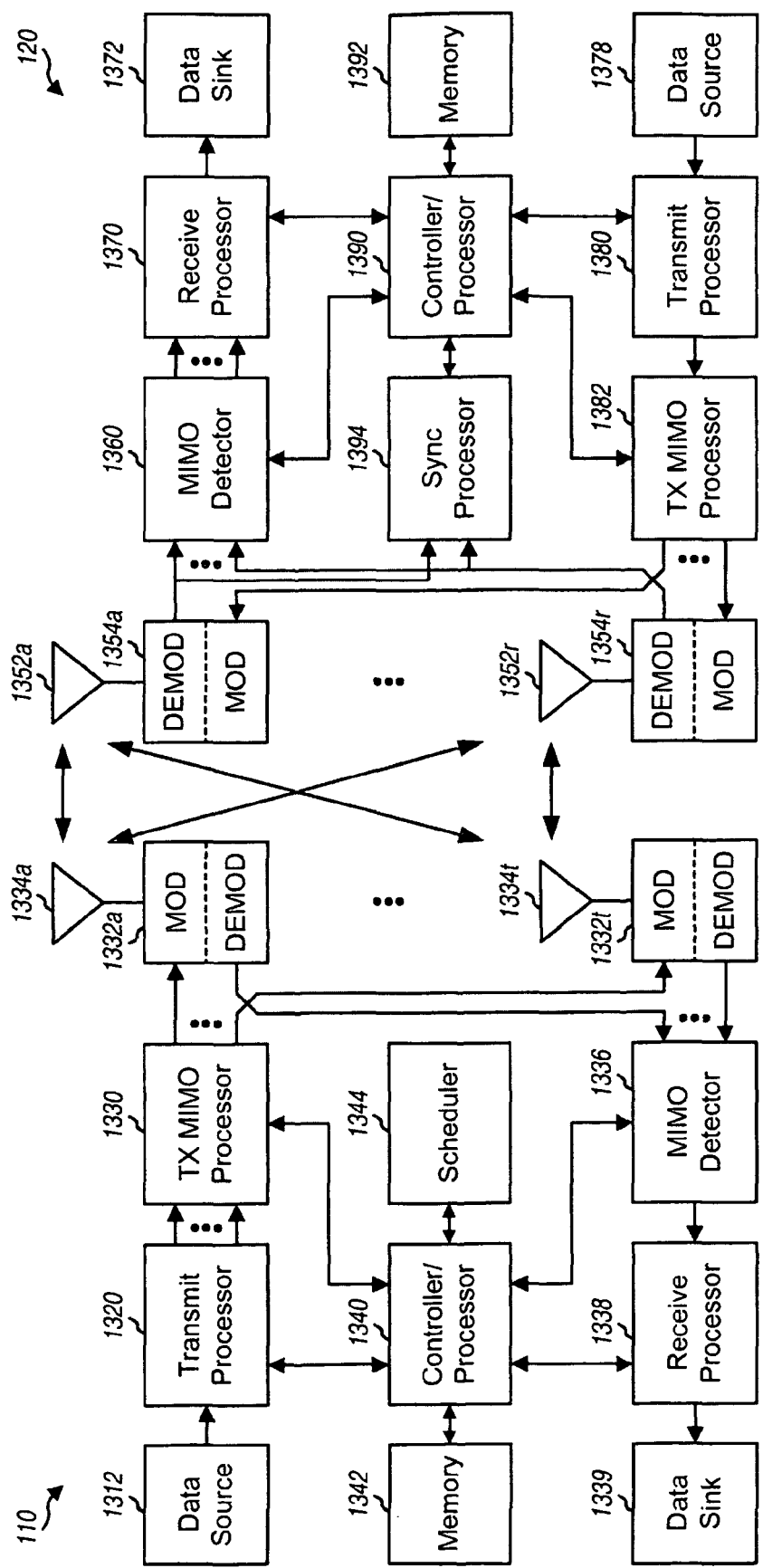
FIG. 13 shows a block diagram of a base station and a UE.

FIG. 13 shows a block diagram of a design of an eNB 110 and a UE 120, which are one of the eNBs and one of the UEs in FIG. 1. In this design, eNB 110 is equipped with T antennas 1334a through 1334t, and UE 120 is equipped with R antennas 1352a through 1352r, where in general T≥1 and R≥1.

At eNB 110, a transmit processor 1320 may receive traffic data for one or more UEs from a data source 1312. Transmit processor 1320 may process (e.g., format, encode, interleave, and symbol map) the traffic data for each UE based on one or more modulation and coding schemes selected for that UE to obtain data symbols. Transmit processor 1320 may also implement secondary synchronization signal generator 400 in FIG. 4 and may generate and provide samples for primary and secondary synchronization signals. A transmit (TX) multiple-input multiple-output (MIMO) processor 1330 may multiplex the data symbols, pilot symbols, and samples for the synchronization signals, perform spatial processing (e.g., precoding) on the multiplexed symbols and samples if applicable, and provide T output symbol streams to T modulators (MODs) 1332a through 1332t. Each modulator 1332 may process a respective output symbol stream (e.g., for OFDM), to obtain an output chip stream. Each modulator 1332 may further process (e.g., convert to analog, amplify, filter, and upconvert) the output chip stream to obtain a downlink signal. T downlink signals from modulators 1332a through 1332t may be transmitted via T antennas 1334a through 1334t, respectively.

At UE 120, antennas 1352a through 1352r may receive the downlink signals from eNB 110 and provide received signals to demodulators (DEMODs) 1354a through 1354r, respectively. Each demodulator 1354 may condition (e.g., filter, amplify, downconvert, and digitize) a respective received signal to obtain received samples and may further process the received samples (e.g., for OFDM) to obtain received symbols. A MIMO detector 1360 may obtain received symbols from all R receivers 1354a through 1354r, perform MIMO detection on the received symbols if applicable, and provide detected symbols. A receive processor 1370 may then process (e.g., demodulate, deinterleave, and decode) the detected symbols and provide decoded data for UE 120 to a data sink 1372. In general, the processing by MIMO detector 1360 and receive processor 1370 is complementary to the processing by TX MIMO processor 1330 and transmit processor 1320 at eNB 110.

On the uplink, at UE 120, traffic data from a data source 1378 and signaling may be processed by a transmit processor 1380, further processed by a TX MIMO processor 1382 if applicable, conditioned by modulators 1354a through 1354r, and transmitted to eNB 110. At eNB 110, the uplink signals from UE 120 may be received by antennas 1334, conditioned by demodulators 1332, processed by a MIMO detector 1336 if applicable, and further processed by a receive processor 1338 to obtain the traffic data and signaling transmitted by UE 120.

Controllers/processors 1340 and 1390 may direct the operation at eNB 110 and UE 120, respectively. Controller/processor 1340 may implement or direct process 500 in FIG. 5, process 600 in FIG. 6, and/or other processes for the techniques described herein. Controller/processor 1390 may implement or direct process 1000 in FIG. 10, process 1100 in FIG. 11, and/or other processes for the techniques described herein. Memories 1342 and 1392 may store data and program codes for eNB 110 and UE 120, respectively. A synchronization (Sync) processor 1394 may detect for primary and secondary synchronization signals based on the received samples, and provide detected cells and their timing, cell IDs, etc. Sync processor 1394 may implement Sync processor 800 in FIG. 8 and secondary synchronization signal detector 840 in FIG. 9. A scheduler 1344 may schedule UEs for downlink and/or uplink transmission and may provide assignments of resources for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits, described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communication, comprising:
   generating a first sequence of a first length based on a first cyclic shift of a maximum length sequence (M-sequence);
   generating a second sequence of the first length based on a second cyclic shift of the M-sequence;
   generating an output sequence of a second length based on the first and second sequences, the second length being longer than the first length; and
   generating a synchronization signal based on the output sequence.

2. The method of claim 1, further comprising:
   determining the first and second cyclic shifts based on information to send in the synchronization signal.

3. The method of claim 1, further comprising:
   determining indices u and v based on cell identity (ID) information, wherein the generating the first sequence comprises generating the first sequence based on a cyclic shift of u of the M-sequence, and wherein the generating the second sequence comprises generating the second sequence based on a cyclic shift of v of the M-sequence.

4. The method of claim 1, wherein the generating the output sequence comprises
   concatenating the first and second sequences, and
   generating the output sequence based on the concatenated first and second sequences.

5. The method of claim 1, wherein the generating the output sequence comprises
   interleaving the first and second sequences, and
   generating the output sequence based on the interleaved first and second sequences.

6. The method of claim 1, wherein the generating the output sequence comprises
   combining the first and second sequences in a first order if the synchronization signal is being sent in a first predetermined slot of a radio frame, and
   combining the first and second sequences in a second order if the synchronization signal is being sent in a second predetermined slot of the radio frame.

7. The method of claim 1, wherein the generating the output sequence comprises generating the output sequence based further on at least one scrambling sequence.

8. The method of claim 1, wherein the generating the output sequence comprises
   scrambling the first sequence with at least one first scrambling sequence,
   scrambling the second sequence with at least one second scrambling sequence, and
   generating the output sequence based on the scrambled first and second sequences.

9. The method of claim 1, wherein the generating the output sequence comprises
   scrambling the first and second sequences with a first set of scrambling sequences if the synchronization signal is being sent in a first predetermined slot of a radio frame, and
   scrambling the first and second sequences with a second set of scrambling sequences if the synchronization signal is being sent in a second predetermined slot of the radio frame, the second set comprising at least one scrambling sequence different from the first set.

10. The method of claim 1, wherein the generating the output sequence comprises generating the output sequence based further on at least one modulation symbol applied to the first and second sequences.

11. The method of claim 1, wherein the generating the synchronization signal comprises
    mapping samples in the output sequence to subcarriers used for the synchronization signal, and
    generating the synchronization signal based on the mapped samples.

12. The method of claim 1, wherein the generating the synchronization signal comprises
    mapping samples in the output sequence to subcarriers used for the synchronization signal,
    mapping at least one pilot symbols to at least one additional subcarrier, and
    generating the synchronization signal based on the mapped samples and the at least one pilot symbol.

13. The method of claim 1, wherein the synchronization signal comprises a secondary synchronization signal, the method further comprising:
    generating a primary synchronization signal;
    sending the primary synchronization signal in a first predetermined symbol period of a slot; and
    sending the secondary synchronization signal in a second predetermined symbol period of the slot.

14. The method of claim 1, wherein the M-sequence has a length of 31.

15. An apparatus for wireless communication, comprising:
    at least one processor configured to generate a first sequence of a first length based on a first cyclic shift of a maximum length sequence (M-sequence), to generate a second sequence of the first length based on a second cyclic shift of the M-sequence, to generate an output sequence of a second length based on the first and second sequences, the second length being longer than the first length, and to generate a synchronization signal based on the output sequence.

16. The apparatus of claim 15, wherein the at least one processor is configured to determine indices u and v based on cell identity (ID) information, to generate the first sequence based on a cyclic shift of u of the M-sequence, and to generate the second sequence based on a cyclic shift of v of the M-sequence.

17. The apparatus of claim 15, wherein the at least one processor is configured to interleave the first and second sequences, and to generate the output sequence based on the interleaved first and second sequences.

18. The apparatus of claim 15, wherein the at least one processor is configured to scramble the first sequence with at least one first scrambling sequence, to scramble the second sequence with at least one second scrambling sequence, and to generate the output sequence based on the scrambled first and second sequences.

19. An apparatus for wireless communication, comprising:
    means for generating a first sequence of a first length based on a first cyclic shift of a maximum length sequence (M-sequence);

means for generating a second sequence of the first length based on a second cyclic shift of the M-sequence;

means for generating an output sequence of a second length based on the first and second sequences, the second length being longer than the first length; and means for generating a synchronization signal based on the output sequence.

20. The apparatus of claim 19, further comprising:
means for determining indices u and v based on cell identity (ID) information, wherein the means for generating the first sequence comprises means for generating the first sequence based on a cyclic shift of u of the M-sequence, and wherein the means for generating the second sequence comprises means for generating the second sequence based on a cyclic shift of v of the M-sequence.

21. The apparatus of claim 19, wherein the means for generating the output sequence comprises
means for interleaving the first and second sequences, and
means for generating the output sequence based on the interleaved first and second sequences.

22. The apparatus of claim 19, wherein the means for generating the output sequence comprises
means for scrambling the first sequence with at least one first scrambling sequence,
means for scrambling the second sequence with at least one second scrambling sequence, and
means for generating the output sequence based on the scrambled first and second sequences.

23. A non-transitory computer-readable storage medium comprising:
code for causing at least one computer to generate a first sequence of a first length based on a first cyclic shift of a maximum length sequence (M-sequence);
code for causing the at least one computer to generate a second sequence of the first length based on a second cyclic shift of the M-sequence;
code for causing the at least one computer to generate an output sequence of a second length based on the first and second sequences, the second length being longer than the first length; and
code for causing the at least one computer to generate a synchronization signal based on the output sequence.

24. The non-transitory computer readable storage medium of claim 23, further comprising:
code for causing the at least one computer to determine indices u and v based on cell identity (ID) information;
code for causing the at least one computer to generate the first sequence based on a cyclic shift of u of the M-sequence; and
code for causing the at least one computer to generate the second sequence based on a cyclic shift of v of the M-sequence.

25. The non-transitory computer readable storage medium of claim 23, further comprising:
code for causing the at least one computer to interleave the first and second sequences; and
code for causing the at least one computer to generate the output sequence based on the interleaved first and second sequences.

26. The non-transitory computer readable storage medium of claim 23, further comprising:
code for causing the at least one computer to scramble the first sequence with at least one first scrambling sequence;
code for causing the at least one computer to scramble the second sequence with at least one second scrambling sequence; and
code for causing the at least one computer to generate the output sequence based on the scrambled first and second sequences.

27. A method for wireless communication, comprising:
obtaining input symbols comprising a synchronization signal generated based on an output sequence of a first length, the output sequence being formed with first and second sequences of a second length corresponding to different cyclic shifts of a maximum length sequence (M-sequence), and the first length being longer than the second length; and
processing the input symbols to detect for the first and second sequences.

28. The method of claim 27, wherein the processing the input symbols comprises descrambling the input symbols with at least one scrambling sequence to obtain descrambled symbols, and
processing the descrambled symbols to detect for the first and second sequences.

29. The method of claim 27, wherein the processing the input symbols comprises performing at least one fast M-sequence transform (FMT) to detect for the first and second sequences.

30. The method of claim 27, wherein the processing the input symbols comprises
demultiplexing the input symbols into a first input sequence and a second input sequence,
processing the first input sequence to obtain first detected values,
processing the second input sequence to obtain second detected values, and
identifying the first and second sequences based on the first and second detected values.

31. The method of claim 30, wherein the first input sequence comprises input symbols with even indices, and wherein the second input sequence comprises input symbols with odd indices.

32. The method of claim 30, wherein the processing the first input sequence comprises
descrambling the first input sequence with a scrambling sequence to obtain a descrambled sequence, and
performing a fast M-sequence transform (FMT) on the descrambled sequence to obtain the first detected values.

33. The method of claim 32, wherein the performing the FMT on the descrambled sequence comprises
reordering symbols in the descrambled sequence to obtain a reordered sequence, performing a fast Hadamard transform (FHT) on the reordered sequence to obtain detected values, and
reordering the detected values from the FHT to obtain the first detected values.

34. The method of claim 32, wherein the processing the first input sequence further comprises generating the scrambling sequence based on cell identity (ID) information from a primary synchronization signal.

35. The method of claim 30, wherein the processing the second input sequence comprises
descrambling the second input sequence with a first scrambling sequence to obtain a first descrambled sequence,
descrambling the first descrambled sequence with multiple second scrambling sequences to obtain multiple second descrambled sequences, and performing multiple fast M-sequence transforms (FMTs) on the multiple second descrambled sequences to obtain the second detected values.

36. An apparatus for wireless communication, comprising:
at least one processor configured to obtain input symbols comprising a synchronization signal generated based on an output sequence of a first length, the output sequence being formed with first and second sequences of a second length corresponding to different cyclic shifts of a maximum length sequence (M-sequence), and the first length being longer than the second length, and to process the input symbols to detect for the first and second sequences.

37. The apparatus of claim 36, wherein the at least one processor is configured to descramble the input symbols with at least one scrambling sequence to obtain descrambled symbols, and to perform at least one fast M-sequence transform (FMT) on the descrambled symbols to detect for the first and second sequences.

38. The apparatus of claim 36, wherein the at least one processor is configured to demultiplex the input symbols into a first input sequence and a second input sequence, to process the first input sequence to obtain first detected values, to process the second input sequence to obtain second detected values, and to identify the first and second sequences based on the first and second detected values.

39. The apparatus of claim 38, wherein the at least one processor is configured to descramble the first input sequence with a scrambling sequence to obtain a descrambled sequence, and to perform a fast M-sequence transform (FMT) on the descrambled sequence to obtain the first detected values.

40. The apparatus of claim 38, wherein the at least one processor is configured to descramble the second input sequence with a first scrambling sequence to obtain a first descrambled sequence, to descramble the first descrambled sequence with multiple second scrambling sequences to obtain multiple second descrambled sequences, and to perform multiple fast M-sequence transforms (FMTs) on the multiple second descrambled sequences to obtain the second detected values.

41. An apparatus for wireless communication, comprising:
means for obtaining input symbols comprising a synchronization signal generated based on an output sequence of a first length, the output sequence being formed with first and second sequences of a second length corresponding to different cyclic shifts of a maximum length sequence (M-sequence), and the first length being longer than the second length; and
means for processing the input symbols to detect for the first and second sequences.

42. The apparatus of claim 41, wherein the means for processing the input symbols comprises
means for descrambling the input symbols with at least one scrambling sequence to obtain descrambled symbols, and
means for performing at least one fast M-sequence transform (FMT) on the descrambled symbols to detect for the first and second sequences.

43. The apparatus of claim 41, wherein the means for processing the input symbols comprises
means for demultiplexing the input symbols into a first input sequence and a second input sequence,
means for processing the first input sequence to obtain first detected values, means for processing the second input sequence to obtain second detected values, and
means for identifying the first and second sequences based on the first and second detected values.

44. The apparatus of claim 43, wherein the means for processing the first input sequence comprises
means for descrambling the first input sequence with a scrambling sequence to obtain a descrambled sequence, and
means for performing a fast M-sequence transform (FMT) on the descrambled sequence to obtain the first detected values.

45. The apparatus of claim 43, wherein the means for processing the second input sequence comprises
means for descrambling the second input sequence with a first scrambling sequence to obtain a first descrambled sequence,
means for descrambling the first descrambled sequence with multiple second scrambling sequences to obtain multiple second descrambled sequences, and
means for performing multiple fast M-sequence transforms (FMTs) on the multiple second descrambled sequences to obtain the second detected values.

46. A non-transitory computer-readable storage medium comprising:
code for causing at least one computer to obtain input symbols comprising a synchronization signal generated based on an output sequence of a first length, the output sequence being formed with first and second sequences of a second length corresponding to different cyclic shifts of a maximum length sequence (M-sequence), and the first length being longer than the second length; and
code for causing the at least one computer to process the input symbols to detect for the first and second sequences.

47. The non-transitory computer readable storage medium of claim 46, further comprising:
code for causing the at least one computer to descramble the input symbols with at least one scrambling sequence to obtain descrambled symbols, and
code for causing the at least one computer to perform at least one fast M-sequence transform (FMT) on the descrambled symbols to detect for the first and second sequences.

48. A method for wireless communication, comprising:
generating a synchronization sequence of length N based on a cyclic shift of a maximum length sequence (M-sequence) of length N, where N is greater than one; and
generating a synchronization signal with the synchronization sequence mapped to N subcarriers in one symbol period, wherein multiple cells are assigned synchronization sequences of different cyclic shifts of the M-sequence, the different cyclic shifts are spaced apart by a predetermined frequency increment, and wherein the multiple cells send synchronization signals generated with the assigned synchronization sequences mapped to the same N subcarriers.

* * * * *